June 8, 1954 — F. W. GREER — 2,680,423
APPARATUS FOR DOUBLE COATING CONFECTIONS
Filed Dec. 13, 1951 — 2 Sheets-Sheet 1
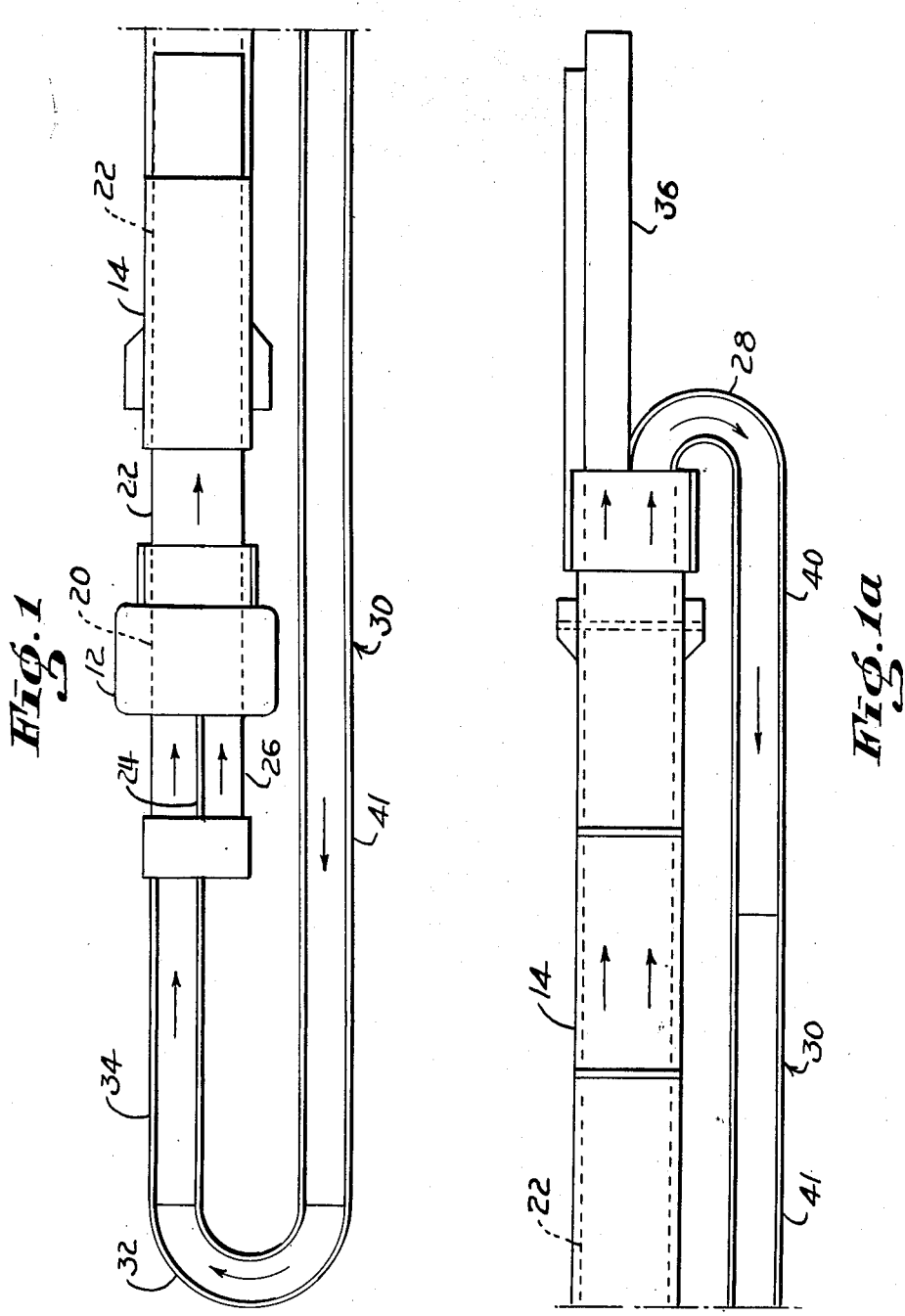
INVENTOR.
Fred W. Greer
Rowland V. Patrick
BY
ATTORNEY

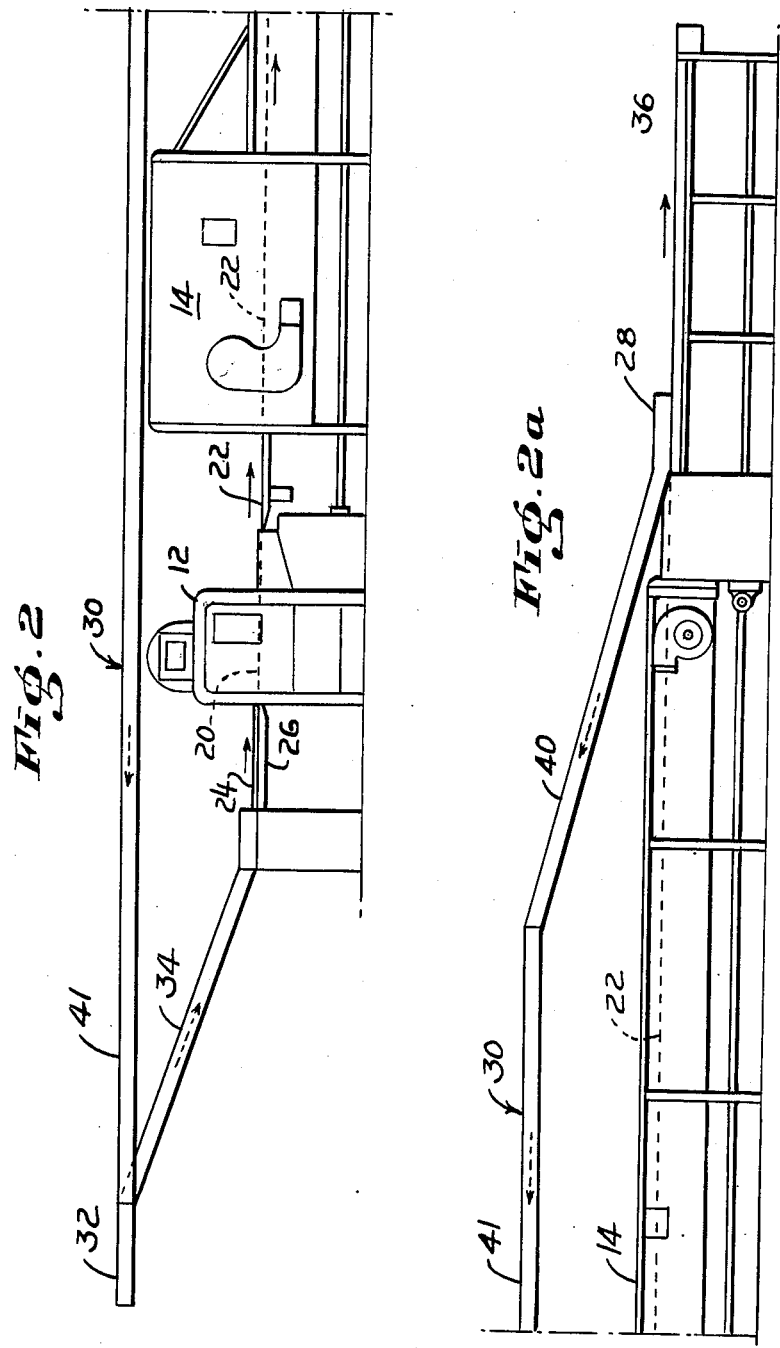

Patented June 8, 1954

2,680,423

UNITED STATES PATENT OFFICE 2,680,423

APPARATUS FOR DOUBLE COATING CONFECTIONS

Fred W. Greer, Belmont, Mass., assignor to J. W. Greer Company, Cambridge, Mass., a corporation of Massachusetts Application December 13, 1951, Serial No. 261,441

3 Claims. (Cl. 118—16)

This invention relates to coating apparatus and more particularly to a novel apparatus for double coating confections such as candies, cookies, and the like.

In the continuous automatic double coating of confections with a substance such as chocolate, it has heretofore been the standard practice in the industry to convey the articles to be coated through a first coating machine, then to cool and solidify the first applied coating before conveying the articles through a second coating machine to apply the second coating to said articles. This practice required, in order to provide a continuous and automatic operation, that two separate coating machines be employed, and that a separate cooling device be used immediately following each of the coating machines in order to cool and solidify each coat immediately after it was applied, since a second coat could not be applied to a still liquid first coat. Thus, duplication of both the coating machine and the cooling device has heretofore been required in order continuously to double coat confections, such duplication being wasteful both in regard to the number of machines required and the floor space the necessary extra machines occupied, especially in instances where confections only infrequently needed to be double coated. The cooling devices, especially, being, in general, extended refrigerated tunnels are particularly wasteful of floor space, besides being expensive.

In view of the foregoing considerations, it is an object of the present invention to provide a continuous automatic double coating apparatus employing but a single coating machine and a single cooling device, thus cutting nearly in half the floor space requirements, as well as greatly reducing the cost involved in providing double coating equipment.

It is a feature of the invention that by its use conventional single coating and cooling apparatus may be easily and quickly converted to a double coating operation, so that the same major components may be used in either single or double coating operations as occasion demands.

For the express purpose of describing a preferred embodiment of the invention, reference is made to the accompanying drawings, in which Figs. 1 and 1a are a plan view of the double coating apparatus of the invention, and Figs. 2 and 2a are a side elevational view of the apparatus of Figs. 1 and 1a.

Referring to the drawings, the double coating apparatus includes a typical confection coating machine 12, for example of the type intended to coat candy centers with a chocolate coating, comprising a tank over which passes a wire or otherwise foraminous conveyor means usually in the form of an endless belt. The tank is adapted to contain, usually at an elevated temperature, a chocolate coating mix. Into this mix extends some sort of mechanism for transferring the mix continuously from the tank to a distributor located over the belt. Thus, as individual candies, spaced along the belt on the upper traverse thereof, are fed through the machine, the mix cascades over the candies from the distributor and the excess returns through the belt to the tank which thus acts as a reservoir. Such devices are well known in the art and require no further description, being described in earlier United States patents, such as No. 2,577,722.

Immediately following the coating machine 12 is arranged a cooling device 14 to receive the freshly coated candies from the coating machine 12 for cooling and solidifying the coating. Such device commonly includes a relatively long refrigerated tunnel having conveyor means therein for continuously moving the candies therethrough in single or layered traverses. A countercurrent of cooling air is generally supplied to speed up the cooling of the candies, but, nevertheless, a substance such as chocolate cools and solidifies quite slowly and requires a long traverse for a continuous operation particularly for fast production.

According to the present invention, I provide a continuous automatic double coating apparatus having but a single coating machine and a single cooling device by employing a conveyor in the form of a loop having parallel runs which pass through the coating machine 12 and cooling device 14. The looped conveyor is preferably made up of a number of segments for easy assembly and such segments may take any one of a number of different forms. However, in order to permit the use of conventional coating machines and cooling tunnels, it is desirable to use but a single wide belt for the parallel runs of the looped conveyor, such a belt being made up of the coating machine belt 20, and the cooling tunnel belt 22, the latter extending from the forward end of the cooling tunnel toward the coating machine belt 20 to provide a continuous conveying means, a single belt being desirable as the freshly coated candies tend to stick to the belt until cooled. With such arrangement, an input belt 26 is provided for the coating belt 20, such input belt preferably having a divider 24 to separate the input belt 26 into two halves so that one half of said belt 26 may be used to feed candies to be coated to one half of the width of the coating belt 20 at one side thereof. The belts 20 and 22 then carry the candies through the coating machine and cooling tunnel, said candies remaining on one half the width of said belts at one side thereof. At the output of the cooling tunnel 14 is provided a return conveyor to take the candies from the half of the parallel conveyor to which they were fed by the input feeding belt 26 and return them to the second half of the coating belt 20 at the other side thereof. Such return conveyor may include a turntable 28 arranged to receive candies from one half side portion of the cooling belt 22 and reverse their direction of travel, a return conveyor belt 30 for continuously carrying the candies in a direction opposite to that of their travel through the coating machine and cooling tunnel, a second turntable 32 arranged to receive candies from the return conveyor 30 and again reverse their direction of travel, and a second input conveyor belt 34 traveling in the same direction as the coating conveyor belt 20 arranged to receive candies from the turntable 32 and feed them to input belt 26 on the other half side portion thereof, all of said belts and turntables being operated at substantially constant and uniform speed.

The candies are thus given a first chocolate coat by their passage through the coating machine 12 on a first half side portion of coating belt 20, such coating being cooled and solidified by their passage through cooling tunnel 14. They are then returned by the return conveyor to the coating machine and are given a second chocolate coat by their passage through the coating machine 12 on a second half side portion of said belt 20, the single and double coating and cooling operations thus taking place simultaneously while the candies pass through the coating machine 12 and cooling device 14 on parallel side-by-side conveyor runs, that is, on the two half side portions of the coating and cooling belts. An output conveyor belt 36 may be provided to receive the double coating candies from the cooling tunnel 14, such output conveyor belt being half the width of the cooling belt 22 and arranged to receive candies only from the same half side portion to which they are fed by belt 34.

It is desirable, in order to have free access to the input belt 26, to elevate at least a portion of the return conveyor 30, hence said conveyor is provided with an upwardly tilted portion 40, and an elevated but level portion 41. Turntable 32 is then elevated to receive candies from the elevated portion 41 of belt 30, and belt 34 tilted to carry the candies downwardly from said turntable to the input belt 26 and coating belt 20.

The turntables 28 and 32 may be any suitable type of device for reversing the direction of travel of the relatively fragile candies without damaging them, a device such as that shown in Greer U. S. Patent No. 2,106,134 being entirely satisfactory. Conveyors and turntables of various types may be utilized, including for example, the conveyor shown in United States Patent No. 2,278,361, and turntables of United States Patents No. 2,106,134 or No. 1,823,483.

It will thus be seen that I have provided a simple and effective apparatus for automatically and continuously double coating confections and, in so doing, have employed but a single coating machine and a single cooling device. Furthermore, by my invention, existing single coating and cooling apparatus may be easily and quickly adapted for double coating with very little increase in floor space. Various modifications, not herein described, within the spirit of my invention and the scope of the appended claims will occur to those skilled in the art.

I claim:

1. Apparatus for continuously double coating confections comprising a conveyor including two unidirectional parallel runs and return conveyor means connecting the output end of one of said runs with the input end of the other of said runs, common confectionery coating means spanning said parallel runs for coating articles as they advance along said one parallel run through said coating means and for recoating said articles as they advance along the other parallel run after they have been returned by said return conveyor means to the input end of said other run and cooling means spanning said conveyor for cooling articles after they advance through said coating means on said one run and before they re-enter said coating means for recoating on said other run.

2. Apparatus as claimed in claim 1, wherein said parallel runs lie in substantially the same horizontal plane.

3. Apparatus for continuously double coating confections comprising a conveyor including two unidirectional parallel runs and return conveyor means connecting the output end of one of said runs with the input end of the other of said runs, common confectionery coating means spanning said parallel runs for coating articles as they advance along said one parallel run through said coating means and for recoating said articles as they advance along the other parallel run after they have been returned by said return conveyor means to the input end of said other run and common cooling means spanning said parallel runs beyond said coating means for cooling articles after they have been coated on said one run and before they are returned by said return conveyor to said other run for recoating, and for cooling said recoated articles on said other run.

References Cited in the file of this patent

UNITED STATES PATENTS

| Number | Name | Date |
|---|---|---|
| 1,871,089 | Shafer | Aug. 9, 1932 |
| 2,260,686 | Segrin | Oct. 28, 1941 |
| 2,421,801 | Miller | June 10, 1947 |
| 2,557,561 | Powers | June 19, 1951 |